United States Patent [19]

Kronbauer et al.

[11] Patent Number: 4,854,697
[45] Date of Patent: Aug. 8, 1989

[54] SLIDES PROJECTOR

[75] Inventors: Hermann Kronbauer, Aschheim; Hermann Kupper; Christian Rehm, both of Munich, all of Fed. Rep. of Germany

[73] Assignee: Reflecta GmbH Foto-Flim Projection, Schwabach, Fed. Rep. of Germany

[21] Appl. No.: 173,830

[22] Filed: Mar. 28, 1988

Related U.S. Application Data

[63] Continuation-in-part of Ser. No. 49,595, May 14, 1987, abandoned.

[51] Int. Cl.4 .................. G03B 21/14; G03B 23/04
[52] U.S. Cl. ........................... 353/89; 353/94; 353/103; 353/118; 353/92; 353/93
[58] Field of Search ............ 353/94, 103, 105, 106, 353/107, 114–118, 25, 82, 83, 86, 89, 90, 92, 93

[56] References Cited

U.S. PATENT DOCUMENTS

| | | | |
|---|---|---|---|
| 3,264,937 | 8/1966 | Antos | 353/83 |
| 3,501,233 | 3/1970 | Winkler et al. | 353/89 |
| 3,773,414 | 11/1973 | Kowalski | 353/118 |
| 3,847,472 | 11/1974 | Sobotta | 353/94 |
| 3,858,972 | 1/1975 | Hirosawa et al. | 353/118 |
| 4,165,161 | 8/1979 | Kramer | 353/94 |
| 4,169,668 | 10/1979 | Grenier | 353/94 |
| 4,466,716 | 8/1984 | Kramer et al. | 353/94 |

FOREIGN PATENT DOCUMENTS 3517376  4/1986  Fed. Rep. of Germany.

Primary Examiner—William A. Cuchlinski, Jr.
Assistant Examiner—Patrick R. Scanlon
Attorney, Agent, or Firm—Bachman & LaPointe

[57] ABSTRACT

In a mixing projector, a guide element for the slide magazine extends transversely with respect to the optical axes of the objective lens systems of the optical assembly. Disposed between the two projector units for projecting the respective slides is a main slider member which is displaceable parallel to the optical axes of the optical assembly, for transportation of slides between the magazine and a slide turning mechanism which turns the respective slides through 90°. Transverse slider members then provide for transportation of the turned slides into and out of the positions thereof for projection through the objective lenses of the optical assembly.

6 Claims, 2 Drawing Sheets

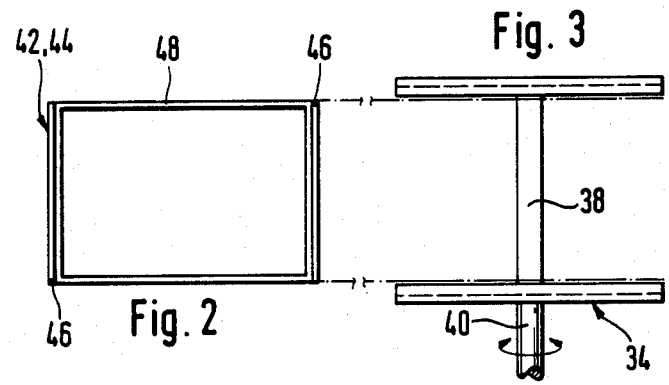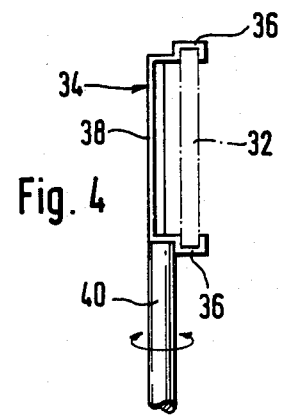

SLIDES PROJECTOR

CROSS REFERENCE TO RELATED APPLICATION

This application is a continuation-in-part of U.S. patent application Ser. No. 49,595, filed May 14, 1987, now abandoned.

BACKGROUND OF THE INVENTION

Various forms of projectors for projecting slides or transparencies are known, for producing cross-bending or mixing of the images. Such a projector may be referred to hereinafter as a mixing projector.

A mixing projector as disclosed for example in German patent specification No. 3,517,376 typically comprises first and second image projector units which are combined together to form an assembly and which each comprise an objective lens, a slide holder and a lighting system. The projector further comprises a guide means for a common slide magazine and a slide change means. In that projector, the guide means for the common magazine conventionally extends in parallel relationship with the optical axes of the optical system including the objective lenses of the image projector units. The respective projector arrangements each comprising the slide carrier and the lighting system are displaceable along the optical axes of the optical systems, to permit a change of slide in the respective projector units.

Now, the displacement required for the respective projector units means that the interior of the projector must include a sapce to permit such movement to take place, and the necessity for that space, which is provided only to permit such movement to occur and does not therefore perform any other useful function, necessarily results in the projector being of correspondingly large size. Furthermore, in a slide change operation, that projector involves the movement of relatively large masses, namely the mass of a projection unit comprising a slide carrier and the lighting system.

SUMMARY OF THE INVENTION

An object of the present invention is to provide a mixing projector which is of a simple construction and which accordingly provides a simple mode of operation.

Another object of the present invention is to provide a mixing projector assembly in which the masses to be moved in a slide change operation are small and which is also of a compact construction.

Still another object of the present invention is to provide a mixing projector which can produce a quick and easy change of slide between one projection phase and another.

In accordance with the present invention, those and other objects are achieved by a mixing projector having first and second projector units each comprising an objective lens, a slide carrier means and a lighting system, with a guide means for a common slide magazine and a slide change means. The guide means for the magazine extends transversely with respect to the optical axes of the first and second projector units, while arranged between those units is a main slider member which is displaceable in substantially parallel relationship to the above mentioned optical axes, for taking a respective slide from the magazine for projection and for introducing a respective slide into the magazine after projection thereof has taken place. Provided in the path of movement of the main slider member is a slide turning means which is rotatable about an axis perpendicular to the direction of movement of the main slider member, for turning the slides introduced into the turning means through at least substantially 90°. Associated with each slide carrier means is a respective transverse slider member for changing a respective slide between the respective carrier means and the above-mentioned turning means.

In the projector according to the present invention the projector units are stationary so that there is no need to provide the above-mentioned space to be found in the prior projector, as was required to permit displacement of the projector units. As a result, the projector in accordance with the invention can be of a more compact construction while the masses involved in movement in the projector according to the invention are also reduced. Such masses only involve the slide or transparency itself and the members required for producing such movement. It will be noted, in regard to the reduction in size of the projector according to the invention and the reduction in the masses to be moved therein, that the common magazine is arranged transversely with respect to the optical axes of the objective lenses of the optical system, thus providing a rational and compact design.

In a preferred feature of the invention, the main slider member is a tongs-like gripper means adapted to grip a slide to be displaced thereby, with the main slider member being slidable between the projector units.

In order to facilitate gripping of a slide by the gripper means in the slide magazine, where the space situation is generally highly restricted, a preferred feature of the invention provides that, disposed at the side of the magazine guide means, which is in opposite relationship to the slide turning means, is a slide ejector for partially ejecting a slide from the magazine. The slide ejector engages the side edge of a slide in the magazine, which is in opposite relationship to the main slider member. The slide which is thus partially ejected from the magazine by the slide ejector is then engaged by the gripper means of the main slider member so that the opening and closing movement of the gripper arms of the gripper means is not impeded or interferred with, by adjacent slides, since the slide to be engaged by the gripper means stands proud from the adjoining slides in the magazine.

In another advantageous feature of the present invention, each transverse slider member comprises first and second rigidly interconnected holding elements, while a respective slide can be pivoted into position between the holding elements by the turning means.

Further objects, features and advantages of the present invention will be apparent from the following description of a preferred embodiment thereof.

BRIEF DESCRIPTION OF THE DRAWINGS

FIG. 2 is a diagrammatic side view of a transverse slider member and a slide turning means of the FIG. 1 projector, the slide turning means being in the position shown in FIG. 1 with broken lines, FIG. 3 is a diagrammatic end view of the slide turning means and a diagrammatic side view of the transverse slider member of the FIG. 1 projector with the slide turning means being in a position shown in FIG. 1 with solid lines and the transverse slider member overlapping the slide turning means, and FIG. 4 shows a diagrammatic end view of the slide turning means and the transverse slider member overlapping the slide turning means, the slide turning means being in a position shown in FIG. 1 with broken lines.

DETAILED DESCRIPTION

Figure 1:
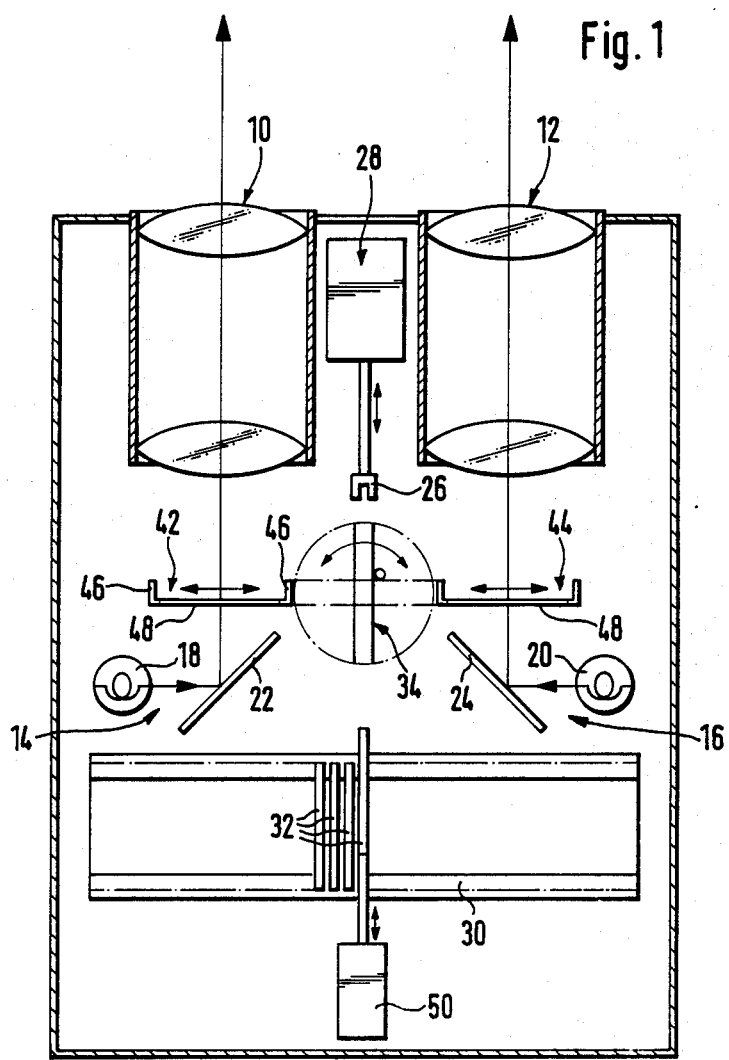
FIG. 1 is a diagrammatic plan view of a projector according to the invention.

Referring firstly to FIG. 1, shown generally therein is a mixing projector according to the invention, comprising two optical systems including objective lenses 10 and 12, whose optical axes extend at least substantially parallel to each other. Arranged on each of the optical axes is a respective lighting system as indicated generally at 14 and 16 in FIG. 1, each including a lighting lamp 18 and 20 and a deflecting mirror 22 and 24 for deflecting the light from the respective lamps 18 and 20 through 90° so that the light is directed along the respective optical axes of the objective lenses 10 and 12. As shown in FIG. 1, the lamps 18 and 20 are disposed at outward positions, in relation to the optical axes. That structural layout of the lighting systems 14 and 16 helps to save space because the length of the projector as considered in the direction of the optical axes of the objective lenses 10 and 12 is shorter in comparison with a layout in which the lamps 18 and 20 are disposed on the respective optical axes of the objective lenses 10 and 12.

The mirrors 22 and 24 may be transmissive in respective of infra-red light and reflect only visible light so that the slides which are to be introduced into the respective paths of the beams passing through the objective lenses 10 and 12 are not unnecessarily heated. Suitable shielding means may be provided behind each of the mirrors 22 and 24 to prevent infra-red light which passes through one mirror from reaching the back of the other mirror.

Disposed between the two objective lenses 10 and 12 of the projector illustrated in FIG. 1 is a main slider member 26 comprising a tongs-like gripper means which is displaceable in parallel relationship to the optical axes of the objective lenses 10 and 12. The griper members of the gripper means 26 may be mounted so as to be pivotable in a horizontal plane, that is to say in the plane of the drawing in FIG. 1.

Reference numeral 28 in FIG. 1 denotes an actuating unit which produces opening and closing movement of the gripper members of the gripper means 26 and linear displacement of the main slider member formed by the gripper means 26, although the actuating unit 28 is only illustrated in diagrammatic form as the precise construction and mode of operation thereof is a matter for the discretion of the man skilled in the art on the basis of his technical knowledge and capabilities.

Referring still to FIG. 1, it will be seen therefrom that the illustrated projector further comprises a guide means 30 for guiding a slide magazine which is common to the two prpojector units 10, 14 and 16, 12 respectively. The magazine carries slides or transparencies as indicated at 32 in FIG. 1. The guide means 30 extends transversely with respect to the optical axes of the objective lenses 10 and 12.

The illustrated projector further includes a slide turning means 34 which, besides being shown in FIG. 1, is also illustrated in greater detail in FIGS. 2-4. It will be seen from FIG. 1 that the slide turning means 34 is disposed in the path of movement of the main slider member 26 which is operative to take a respective slide 32 from the slide magazine for projection of that slide and to restore a slide after projection to the magazine.

As shown in FIGS. 2 to 4, the slide turning means 34 comprises two spaced-apart horizontal U-shaped members 36 for accommodating a slide 32, and a carrier portion 38 which connects the two members 36 together and to which there is fixed a vertically extending rotary rod or shaft 40, for turning the U-shaped members 36 through 90°, as can be seen from the plan view in FIG. 1. It will be appreciated that the reference to the members 36 being horizontal and the rotary shaft 40 being vertical are in relation to the positions of those components when the projector is standing on a suitable surface or the like, for operation thereof.

When the slide turning means 34 is in the position shown in solid lines in FIG. 1, in which the members 36 extend at least substantially parallel to the optical axes of the objective lenses 10 and 12, then, because the carrier portion 38 is sufficiently spaced from the plane in which the slide carried by the members 36 is disposed, the gripper means formed by the main slider member 26 can engage through the slide turning means 34 and can take a slide 32 from the magazine and deposit it in the slide turning means 34. After having deposited a slide in the slide turning means 34, the gripper means 26 is then further retracted, that is to say, moved further towards the actuating unit 28 in order to clear the slide turning means 34, in order not to impede pivotal movement of the slide turning means. The slide turning means 34 then turns the slide, the plane of which is still parallel to the optical axes of the objective lenses 10 and 12, through an angle of 90° so that as a result the slide is then disposed transversely with respect to the optical axes of the objective lenses 10 and 12. The slide turning means 34 is then in the position shown in broken lines in FIG. 1.

So that the slide can then be moved from the slide turning means into the path of the light through the respective objective lenses 10 and 12, a transverse slider member 42 and 44 is associated with each objective lens 10 and 12 of the respective projector units.

Suitable conventional means (not shown) known in the art are provided to move each transverse slider member 42 and 44 along a path substantially transverse to the beam(s) of light through the objective len(s).

The transverse slider members 42 and 44 which are also shown in greater detail in FIGS. 2 to 4 essentially comprise two vertical holding elements 46 which are rigidly interconnected, at such a spacing that a slide 32 can fit therebetween. The holding elements 46 are rigidly connected together by a bracket 48, as can be clearly seen from FIGS. 2 to 4. As it can be seen from the drawings, the holding elments 46 of each transverse slider member 42 and 44 are shorter than the spacing between the members 36 of the slide turning means 34 so that the transverse slider members 42 and 44 can be pushed into a position between the members 36 when the slide turning means 34 is in the broken-line position in FIG. 1. The rotary shaft 40 with the carrier portion 34 is also laterally spaced from the members 36, as can be seen from FIGS. 3 and 4 but also from FIG. 1 where the position of the rotary shaft 40 is indicated in diagrammatic manner. In that case, as indicated in FIG. 1, the carrier portion 38 is then disposed outside the path of movement of the prespective transverse slider member 42, 44. It will further be noted that the frame structure 48 which holds the holding elements 46 together is advantageously disposed on the side of the transverse slider members, which is towards the slide magazine, as shown in FIG. 4.

The transverse slider member 42 or the transverse slider member 44 is disposed at the location of the slide turning means 34 when it is oriented parallel to the optical axes of the objective lenses 10 and 12 as can be seen from FIG. 3. When a slide has been put into the slide turning means 34 by means of the gripper means 26, the slide turning means 34 can then be turned through 90°, with the slide then being pivoted into a position between the holding elements 46 of the respective transverse slider member (see FIG. 4). Then, displacement of the respective transverse slider member into the respective path of the beam along the optical axes of the objective lenses 10 and 12 causes the slide carried by that transverse slider member to be moved into the path of the light, whereby the image of that slide can then be projected through the respective objective lens 10 or 12 see also FIG. 2 where reference numerals 50 designate stationary U-shaped members located in the optical axis of the objective lens 10 resp. 12. The individual slides are restored to the slide magazine, by reversing the above-indicated sequence of movements. The transverse slider member 42 or 44 with a slide carried thereby is displaced out of the path of the beam of light through the respective objective lens 10 or 12, to the slide turning means 34 which at that time is oriented perpendicularly to the optical axes of the objective lenses 10 and 12. The slide turning means 34 is then turned through 90° so that it is parallel to the optical axes. The gripper means 26 is then brought into operation to grip the slide in the slide turning means, push it from the slide turning means towards the magazine, and insert it into a free space in the magazine. The transportation movement of the slide magazine is produced by any suitable form of actuating mechanism such as a Pilger stepping arrangement.

The overall sequence of operating movement is thus as follows:
1. The main slider member 26 takes a slide from the magazine and puts it into the slide turning means 34 which is in parallel relationship to the optical axes of the lenses 10 and 12;
2. The slide turning means 34 rotates through 90° so that the slide is introduced into the transverse slider member, for example 42, which is in a position of association with the slide turning means 34;
3. The transverse slider member moves the slide from the slide turning means 34 into the path of the beam of light through the objective lens, for example 10;
4. The transverse slider member 44 moves the slide from the path of the beam of light through the objective lens 12 into the slide turning means 34;
5. The slide turning means 34 turns through 90° so that it is again parallel to the optical axes of the lenses 10 and 12;
6. In the course of one of steps 2 through 5 above, the slide magazine was returned by one stepping movement;
7. The main slider member 26 moves the slide from the slide turning means 34 back into the magazine;
8. The slide magazine performs two steps forwardly; and
9. As in step 1 above.

As the slides in the magazine are in closely adjoining relationship so that it would be difficult for the gripper members of the gripping means 26 to be engaged between the individual slides in the magazine, the projector advantageously includes a slide ejector 50 which is disposed on the side of the magazine opposite to the main slider member 26, as shown in FIG. 1. The ejector 50 partially ejects a slide out of the magazine so that it can be more easily gripped by the gripper means 26. FIG. 1 shows a slide 32 in the partially ejected position from which it will be seen that a side edge portion thereof, which is towards the gripper means 26 and the slide turning means 34, stands proud of the magazine and the guide means 30.

It will be appreciated that the above described embodiment of the projector according to the invention has been set forth solely by way of example thereof and that various modifications and alterations may be made therein without departing from the spirit and scope of the invention.

What is claimed is:

1. A mixing projector comprising: first and second image projector means forming a projection assembly and each comprising an objective lens, a slide projection position and lighting system; a guide means for mounting a common slide magazine for accommodating a plurality of slides, said guide means extending transversely with respect to the optical axes of the first and second projector means; a main slider member arranged between the first and second projector means, said main slider member displaceable in parallel relationship to said optical axes, for taking a respective slider from said magazine for projection thereof and for introducing a respective slide into the magazine after projection thereof; a slide turning means disposed in the path of displacement of the main slider member, said slide turning means being rotatable about an axis at least substantially perpendicular to the path of displacement of said main slider member, for turning the slides introduced into the turning means through 90°; and a respective transverse slider member operatively associated with each said slide projection position for changing a respective slide between the respective slide projection position and said turning means.

2. A projector as set forth in claim 1 wherein said main slider member comprises a gripper means for gripping a respective said slide.

3. A projector as set forth in claim 1 and further including at the side of said guide means which is in opposite relationship to said turning means a slide ejector means operable to engage a side edge of a respective slide in said magazine, which is opposite to said main slider member, for partial ejection of the engaged slide from said magazine.

4. A projector as set forth in claim 1 wherein each said transverse slider member comprises first and second rigidly interconnected holding elements adapted to hold a slide therebetween, whereby a respective said slide can be pivoted into a position between said holding elements by said turning means.

5. A projector as set forth in claim 1 wherein said turning means comprises first and second holding members of generally U-shaped cross-section for receiving a respectve slide therebetween, said holding members being disposed perpendicularly to the axis of rotation of said turning means, and a narrow carrier portion interconnecting said members and disposed outside the path of displacement of said main slider member.

6. A mixing projector comprising: first and second projector units disposed in side-by-side and spaced relationship and each comprising an objective lens means and a lighting system, for projecting the images of respective slides; means for displaceably mounting a magazine for accommodating a plurality of slides wherein at least a portion of said mounting means extends transversely with respect to the optical axes of said projector units; slide turning means operatively disposed between said projector units and said magazine mounting means and actuable to return a slide carried by said slide turning means between a first position of being disposed parallel to said optical axes and a second position of being perpendicular to said optical axes; first transfer means disposed between said first and second projector units and displaceable parallel to said optical axes, operable for transferring a slide between said magazine and said turning means when said turning means is in a first position; and second transfer means for displacing a slide between said turning means when said turning means is in a second position and a position on the optical axis of a respective said projector unit for projection thereby.

* * * * *